United States Patent Office 3,368,166
Patented Feb. 6, 1968

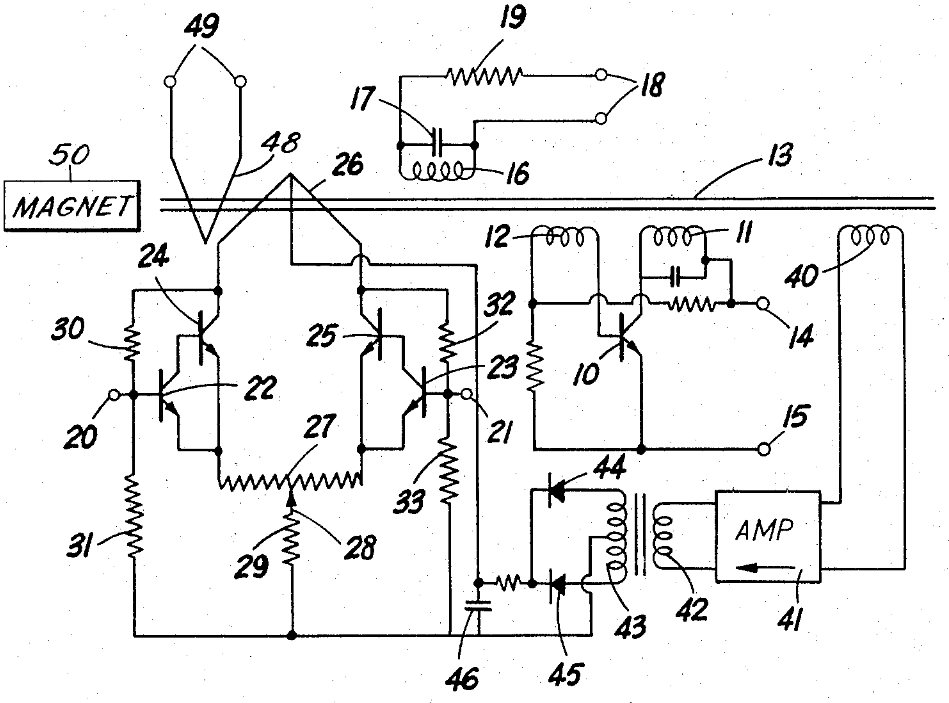
Willie Fletcher
Inventor
By Cushman, Darby & Cushman
Attorneys

3,368,166

VARIABLE FREQUENCY VOLTAGE-CONTROLLED OSCILLATOR WITH CONTROL CIRCUIT ISOLATED FROM FIXED POTENTIALS

Willie Fletcher, Chertsey, England, assignor to Dynatel Limited, Feltham, England, a British company Filed Apr. 15, 1966, Ser. No. 542,857
Claims priority, application Great Britain, June 16, 1965, 25,528/65
6 Claims. (Cl. 331—117)

ABSTRACT OF THE DISCLOSURE

A voltage-controlled oscillator having a frequency dependent on an input control voltage comprising a transistor with output and feedback windings on a ferromagnetic core, control means for magnetically biasing the core, a voltage responsive transistor circuit for feeding a further winding on the core in accordance with an input control voltage so as thereby to alter the reluctance of the core and hence the frequency of oscillation, an amplifier for amplifying part of the oscillator output, and a transformer coupling the amplifier output to rectifying means for rectifying the amplified oscillations to provide DC power for said voltage responsive circuit. The voltage responsive circuit is thus completely isolated from any outside source of power and hence is isolated from ground potential.

This invention relates to voltage-controlled oscillators, that is to say oscillators in which the frequency of oscillation is controlled in accordance with the magnitude of an applied voltage.

It is an object of the present invention to provide a variable frequency voltage controlled oscillator in which the control circuit is completely isolated from fixed potentials and, in particular, is isolated from ground potential even though the source of power supply for the oscillator has a grounded terminal.

According to this invention, a voltage-controlled oscillator comprises an oscillator circuit producing an alternating signal in a winding on a ferro-magnetic core, which winding is included in the feedback path of the oscillator circuit so that the oscillator frequency depends on the reluctance of the core, a second winding on said core, and a transistor circuit for controlling the direct current through said second winding in accordance with the magnitude of an input signal which transistor circuit is supplied with direct current power from a rectifier circuit rectifying alternating voltage inductively coupled from said oscillator. It will be seen that with the above-described arrangement the input for the control voltage is completely isolated, so far as direct potentials are concerned, from the supply source and hence can be completely isolated from ground. Conveniently the rectifier circuit rectifies alternating voltage from a third winding on said core; the output from the third winding is preferably amplified before being fed to said rectifier circuit to reduce the load on the winding.

Heretofore in voltage-controlled oscillators there has invariably been some direct current leakage path between the applied input signal circuit and ground or a comon supply rail and the leakage through this path makes it difficult to maintain the output frequency truly proportional to the input voltage. Furthermore this makes it difficult to obtain flexibility in the use of such oscillators in telemetering and similar systems. In the arrangement of the present invention on the other hand, the input circuit is isolated from the supply, the necessary direct current supply for any transistor or transistors in the input circuit being obtained from the rectifier circuit rectifying a voltage from the oscillator output, conveniently a voltage picked up by the third winding on the core as described above. The flux in the core varies with variations in the direct current through said second winding and hence depends on the applied voltage input. Changes in flux change the inductanc of the winding of the oscillator circuit and hence change the oscillator frequency which thereby depends on the applied input voltage although there is no direct current connection. The isolation of the input circuit from ground is of particular importance in voltage-controlled oscillators which have to give an output having a frequency dependent on the difference of two input voltages, for example the difference between a control voltage and a reference voltage. Thus the aforesaid second winding may be connected in a differential amplifier circuit so that the net current coupled to the core depends on the difference of the potentials applied to the differential amplifier.

This arrangement of the present invention has the further advantage that it is readily possible to obtain an output which is also isolated, so far as direct voltages are concerned, from the supply and from the input. This may be done by providing an output winding on the core. This output winding conveniently may be tuned by connecting a capacitor across the winding.

The following is a description of one embodiment of the invention reference being made to the accompanying drawing which is a circuit diagram of a voltage-controlled oscillator.

The frequency is inversely proportioned to the square root of the inductance in a tuned circuit and conveniently the whole of the tuned circuit inductance is provided by the winding on the core. In this case a linear relationship between the input signal and output frequency can be obtained by providing a bias winding on the core to give a flux to bias the core to a square law part of the incremental permeability curve.

Referring to the drawing there is illustrated a relaxation oscillator comprising a transistor 10, which is illustrated as being of the npn type. Coupled windings 11, 12 of a transformer are arranged in the collector and base circuits respectively of the transistor 10 to form a relaxation oscillator. The windings 11, 12 are arranged on a ferro-magnetic core 13 of the transformer and hence the frequency of oscillation of the oscillator depends on the flux through the core 13. The direct current supply source for the transistor 10 is obtained from terminals 14, 15. An output is obtained from an output winding 16 on the transformer which winding is tuned by a tuning capacitor 17 and is connected to output terminals 18 through a resistor 19. The input signal for controlling the oscillator frequency is applied across input terminals 20, 21 connected respectively to the bases of two transistors 22, 23 which are illustrated in this particular example as npn transistors. These two transistors are the input transistors of two Darlington amplifier pairs arranged in a differential amplifier circuit with the collectors of output transistors 24, 25 connected respectively to the two ends of a further winding 26 on the transformer core 13. The emitters of the two transistors 22, 24 are connected to the one end of a potentiometer 27 and the emitters of transistors 23, 25 to the other end. This potentiometer 27 has an adjustable tap 28 connected to a common emitter load resistor 29. Resistors 30, 31 provide a bias for the base of transistor 22 and resistors 32, 33 provide a bias for the base of transistors 23.

The direct current supply for the transistors 22 to 25 is obtained from a further winding 40 on the transformer 13. The output from this winding 40 is fed to an amplifier 41 having an output transformer 42 with a secondary winding 43. The two ends of this secondary winding 43 are connected respectively to two half-wave rectifiers 44, 45 to form a full-wave rectifier circuit with a smoothing capacitor 46. The rectified output voltage is applied between a centre tap on the winding 26 and the bottom end of resistor 29.

It is convenient to split the winding 26 into two sections and to use a core 13 having two apertures, that is to say a closed loop core with an arm across the loop. An alternating flux is set up in the core 13, but, by putting the two sections of the winding 26 on opposite sides of the loop and the other windings on the central arm, the alternating voltages induced in the two sections of the winding 26 cancel.

It will be seen that any difference in direct voltage between the terminals 20, 21 will unbalance the differential amplifier circuit and hence cause direct current to flow through the winding 26. The adjustable tap 28 enables the zero setting to be adjusted to give zero current when the potentials on terminals 20, 21 are the same. Any direct current through the winding 26 will produce a flux in the core 13. Any resultant change in reluctance of the core due to such changes in applied voltage at terminals 20, 21 will cause the frequency of the relaxation oscillator to alter. Hence the oscillator frequency will depend on the difference in the direct potentials at terminals 20, 21. The use of the alternating current amplifier 41 reduces any loading on the core 13 due to power requirements for direct current power for the transistors 22 to 25. The core can be magnetically biased to operate on the square law part of the incremental permeability curve; a permanent magnet may be used for this as indicated diagrammatically at 50 or a bias winding as shown at 48 fed from a direct current source represented by terminals 49. Since the frequency of the oscillator is inversely proportional to the square root of the inductance in the tuned circuit, this enables a linear relationship between frequency and input signal to be obtained.

Because the input differential amplifier is isolated from the output and supply circuits, it is readily possible to apply any required reference voltage to one of the terminals 20, 21. This reference voltage may be derived from the output circuit so as to give a negative feedback to improve further the linearity of the response. For this purpose the feedback voltage has to have a magnitude dependent upon the frequency of the output signal but many circuits are known for this purpose.

A further advantage of the arrangement described above is that the input differential amplifier may readily be arranged to have a high input impedance so that it does not draw any current from the source of applied control voltage.

By suitable choice of bias for the transistor 10 in the oscillator circuit, it is readily possible to arrange for the device described above to give a sinusoidal output. This thereby avoids any necessity for a filter in the output, a feature which is of particular importance in some applications, for example in data handling using frequency modulation techniques, wherein computational problems are introduced by these time delays which are different for different frequencies. In other cases however it may be more convenient to obtain a sinusoidal output by using a high Q filter in the output from the transformer.

A further advantage of the arrangement described in which the input terminals are isolated from ground and the output terminals is that it is readily possible to apply a control reference signal to one of the input terminals; for example temperature compensation may be effected by applying a suitable temperature dependent signal to one of the terminals 20, 21.

I claim:

1. A voltage-controlled oscillator comprising a ferromagnetic core, a first winding on said core, an oscillator circuit producing an alternating signal in said first winding on a ferro-magnetic core, which winding is included in the feedback path of the oscillator circuit so that the oscillator frequency depends on the reluctance of the core, a second winding on said core, a transistor amplifier circuit having a signal input adapted to receive a control signal, a signal output and a power supply input, circuit means connecting the amplifier signal output to said second winding, a rectifier circuit rectifying alternating voltage inductively coupled from said oscillator and circuit means for supplying said rectified alternating voltage to said power supply input as direct current power for said amplifier circuit.

2. A voltage-controlled oscillator as claimed in claim 1, wherein said amplifier comprises a differential amplifier circuit, said second winding being connected in the differential amplifier circuit so that the net current coupled to the core depends on the difference of the potentials applied to the differential amplifier.

3. A voltage-controlled oscillator as claimed in claim 1, wherein a bias winding is provided on the core to give a flux to bias the core to a square law part of the incremental permeability curve.

4. A voltage-controlled oscillator as claimed in claim 1, and having a permanent magnet biasing said core.

5. A voltage-controlled oscillator comprising a ferromagnetic core, a first winding on said core, an oscillator circuit producing an alternating signal in said first winding on a ferro-magnetic core, which winding is included in the feedback path of the oscillator circuit so that the oscillator frequency depends on the reluctance of the core, a second winding on said core, a differential amplifier circuit connected to said second winding and having two input terminals and a power supply input and arranged to control the current through said second winding in accordance with the difference of the potentials applied to said two input terminals, a rectifier circuit for rectifying an alternating voltage, a further winding on said core, a further amplifier coupled to said further winding to amplify the output from said further winding, a transformer coupling the output of said further amplifier to said rectifier circuit and circuit means for supplying said rectified alternating voltage to said power supply input as direct current power for said differential amplifier circuit.

6. A voltage controlled oscillator as claimed in claim 5 wherein magnetic biasing means are provided giving a magnetic flux through said core to bias it to a square law part of the incremental permeability curve.

References Cited

UNITED STATES PATENTS

| | | | |
|---|---|---|---|
| 2,777,955 | 1/1957 | Gabor | 331—36 |
| 2,811,642 | 10/1957 | Gabor | 311—36 |
| 3,275,948 | 9/1966 | Rosenbusch | 331—181 |

JOHN KOMINSKI, *Primary Examiner.*

ROY LAKE, *Examiner.*